United States Patent
Nawaz

(10) Patent No.: US 12,063,207 B2
(45) Date of Patent: Aug. 13, 2024

(54) NON-INTERFERING ACCESS LAYER END-TO-END ENCRYPTION FOR IOT DEVICES OVER A DATA COMMUNICATION NETWORK

(71) Applicant: Fortinet, Inc., Sunnyvale, CA (US)

(72) Inventor: Kaashif Hassan Nawaz, England (GB)

(73) Assignee: Fortinet, Inc., Sunnyvale, CA (US)

( * ) Notice: Subject to any disclaimer, the term of this patent is extended or adjusted under 35 U.S.C. 154(b) by 438 days.

(21) Appl. No.: 17/487,344

(22) Filed: Sep. 28, 2021

(65) Prior Publication Data

US 2023/0095149 A1 Mar. 30, 2023

(51) Int. Cl.
*H04L 9/40* (2022.01)

(52) U.S. Cl.
CPC .......... *H04L 63/0485* (2013.01); *H04L 63/08* (2013.01)

(58) Field of Classification Search
CPC . H04L 63/0485; H04L 63/08; H04L 63/0428; H04L 63/0281
See application file for complete search history.

(56) References Cited

U.S. PATENT DOCUMENTS

| | | | | |
|---|---|---|---|---|
| 6,542,992 B1 * | 4/2003 | Peirce, Jr. | ............. | H04L 69/161 713/153 |
| 7,340,535 B1 * | 3/2008 | Alam | .................... | H04L 45/586 709/236 |
| 8,238,834 B1 * | 8/2012 | Bharghavan | .......... | H04W 24/06 379/1.01 |
| 8,243,903 B1 * | 8/2012 | Hyndman | ............. | H04M 3/568 709/204 |
| 8,429,276 B1 * | 4/2013 | Kumar | .................. | G06F 9/5077 718/1 |
| 8,538,272 B1 * | 9/2013 | Robinson | ........... | H04B 10/2513 398/187 |
| 8,543,703 B1 * | 9/2013 | Pon | ..................... | H04L 67/1044 709/227 |
| 9,231,918 B2 * | 1/2016 | Khan | ...................... | H04L 63/16 |
| 9,356,824 B1 * | 5/2016 | Khanal | ................... | H04L 61/45 |
| 9,565,158 B1 * | 2/2017 | Cooley | ................. | H04W 12/03 |
| 9,769,368 B1 * | 9/2017 | Morford | .............. | H04N 23/617 |
| 9,860,225 B1 * | 1/2018 | Chamberlin | ........ | H04L 61/2514 |
| 9,912,699 B1 * | 3/2018 | Hebbar | ................. | H04L 69/326 |
| 10,122,699 B1 * | 11/2018 | Ellingson | ................ | G06F 21/60 |
| 10,341,126 B2 * | 7/2019 | Stammers | ............... | H04L 45/38 |
| 10,404,702 B1 * | 9/2019 | Chakraborty | ......... | H04L 63/101 |
| 10,755,543 B1 * | 8/2020 | Usie | ................. | G08B 13/19634 |
| 11,012,430 B1 * | 5/2021 | Hufker | ................ | H04L 63/0492 |
| 11,076,292 B1 * | 7/2021 | Wilson | .................. | H04W 12/37 |

(Continued)

*Primary Examiner* — Aravind K Moorthy
(74) *Attorney, Agent, or Firm* — Law Office of Dorian Cartwright; Dorian Cartwright

(57) ABSTRACT

Once a new session of data packets is detected, whether to proxy encrypt the data packets, on behalf of a specific headless endpoint device from the plurality of headless endpoint devices for a session, is determined based on analysis of payload data of a data packet from a session. Responsive to a determination to proxy encrypt data packets, encryption attributes are set up between a local data port on the network device and a remote data port on a remote network device as parsed from a header of the data packet. Outbound and inbound data packets of the session secure OSI layers 4 to 7 of the outbound data packets of the session are encrypted, according to the encryption attributes, without interference to OSI layers 1 to 3.

12 Claims, 6 Drawing Sheets

(56) References Cited

U.S. PATENT DOCUMENTS

| | | | | |
|---|---|---|---|---|
| 11,159,560 B1* | 10/2021 | Limb | | H04L 63/1416 |
| 11,588,798 B1* | 2/2023 | Cline | | H04L 45/74 |
| 11,863,528 B1* | 1/2024 | Chung | | H04L 69/22 |
| 2003/0061518 A1* | 3/2003 | Yamaguchi | | H04L 9/321 |
| | | | | 726/6 |
| 2003/0095663 A1* | 5/2003 | Nelson | | H04W 12/02 |
| | | | | 713/168 |
| 2003/0179882 A1* | 9/2003 | Itano | | H03M 7/40 |
| | | | | 380/28 |
| 2003/0188192 A1* | 10/2003 | Tang | | H04L 63/0263 |
| | | | | 726/13 |
| 2004/0083360 A1* | 4/2004 | Walsh | | G11B 20/00507 |
| | | | | 713/160 |
| 2004/0123159 A1* | 6/2004 | Kerstens | | H04L 63/08 |
| | | | | 713/168 |
| 2004/0158705 A1* | 8/2004 | Burdett | | H04L 63/0272 |
| | | | | 713/151 |
| 2004/0243349 A1* | 12/2004 | Greifeneder | | H04L 63/1408 |
| | | | | 702/183 |
| 2005/0055579 A1* | 3/2005 | Kanda | | H04L 63/20 |
| | | | | 726/4 |
| 2005/0152287 A1* | 7/2005 | Yokomitsu | | H04L 65/1101 |
| | | | | 370/255 |
| 2006/0165133 A1* | 7/2006 | Yokota | | H04W 52/0225 |
| | | | | 372/9 |
| 2006/0171388 A1* | 8/2006 | Ikeda | | H04W 8/005 |
| | | | | 370/389 |
| 2006/0256817 A1* | 11/2006 | Durst | | H04L 69/161 |
| | | | | 370/231 |
| 2006/0291650 A1* | 12/2006 | Ananth | | H04L 9/065 |
| | | | | 380/37 |
| 2007/0060213 A1* | 3/2007 | Yoshida | | H04W 76/14 |
| | | | | 455/343.1 |
| 2007/0116285 A1* | 5/2007 | Nakai | | H04L 63/0428 |
| | | | | 380/255 |
| 2007/0199049 A1* | 8/2007 | Ziebell | | H04L 63/10 |
| | | | | 726/3 |
| 2007/0286420 A1* | 12/2007 | MacLean | | H04N 21/47202 |
| | | | | 348/E7.071 |
| 2008/0170566 A1* | 7/2008 | Akimoto | | H04L 61/5014 |
| | | | | 370/389 |
| 2008/0253302 A1* | 10/2008 | Nago | | H04W 8/005 |
| | | | | 370/254 |
| 2009/0059957 A1* | 3/2009 | Bagepalli | | H04L 63/205 |
| | | | | 370/469 |
| 2009/0070857 A1* | 3/2009 | Azuma | | G06F 21/33 |
| | | | | 726/3 |
| 2009/0080460 A1* | 3/2009 | Kronewitter, III | | H04L 47/10 |
| | | | | 370/466 |
| 2009/0212928 A1* | 8/2009 | Aijaz | | H04W 4/44 |
| | | | | 340/426.1 |
| 2009/0313464 A1* | 12/2009 | Shukla | | H04W 12/033 |
| | | | | 713/151 |
| 2010/0061355 A1* | 3/2010 | Tsuchiya | | H04W 4/20 |
| | | | | 370/310 |
| 2010/0146129 A1* | 6/2010 | Nakahara | | H04W 48/20 |
| | | | | 709/228 |
| 2010/0158009 A1* | 6/2010 | Lee | | H04L 47/2441 |
| | | | | 370/392 |
| 2010/0191968 A1* | 7/2010 | Patil | | H04W 12/0431 |
| | | | | 713/170 |
| 2010/0299265 A1* | 11/2010 | Walters | | H04L 63/0823 |
| | | | | 705/67 |
| 2011/0188421 A1* | 8/2011 | Nakahara | | H04W 52/02 |
| | | | | 370/311 |
| 2011/0231659 A1* | 9/2011 | Sinha | | H04L 63/18 |
| | | | | 713/168 |
| 2011/0294442 A1* | 12/2011 | Tsujimoto | | H04L 69/22 |
| | | | | 455/73 |
| 2012/0030466 A1* | 2/2012 | Yamaguchi | | H04L 9/3213 |
| | | | | 713/168 |
| 2012/0102143 A1* | 4/2012 | Mandre | | H04L 63/0478 |
| | | | | 709/217 |
| 2012/0127991 A1* | 5/2012 | Le Rouzic | | H04L 65/1016 |
| | | | | 370/352 |
| 2012/0164976 A1* | 6/2012 | Ando | | H04L 12/2834 |
| | | | | 455/410 |
| 2012/0166582 A1* | 6/2012 | Binder | | G06F 21/78 |
| | | | | 709/217 |
| 2012/0174187 A1* | 7/2012 | Argon | | H04K 3/827 |
| | | | | 726/2 |
| 2012/0216036 A1* | 8/2012 | Barsoum | | H04L 63/0428 |
| | | | | 713/160 |
| 2013/0046696 A1* | 2/2013 | Radhakrishnan | | H04L 63/10 |
| | | | | 705/65 |
| 2013/0061034 A1* | 3/2013 | Walheim, Sr. | | H04L 63/0272 |
| | | | | 713/150 |
| 2013/0195109 A1* | 8/2013 | Ogawa | | H04L 69/08 |
| | | | | 370/392 |
| 2013/0195450 A1* | 8/2013 | Ashwood-Smith | | |
| | | | | H04J 14/0257 |
| | | | | 398/49 |
| 2013/0219171 A1* | 8/2013 | Gearhart | | H04L 63/0485 |
| | | | | 713/153 |
| 2014/0007235 A1* | 1/2014 | Glenn | | G06F 21/566 |
| | | | | 726/23 |
| 2014/0022398 A1* | 1/2014 | Kimura | | H04N 1/00209 |
| | | | | 348/207.1 |
| 2014/0105094 A1* | 4/2014 | Soundararajan | | H04W 48/16 |
| | | | | 370/312 |
| 2014/0139670 A1* | 5/2014 | Kesavan | | B60W 30/00 |
| | | | | 348/148 |
| 2014/0154986 A1* | 6/2014 | Lee | | H04B 7/26 |
| | | | | 455/41.2 |
| 2014/0187149 A1* | 7/2014 | Lortz | | H04W 76/14 |
| | | | | 455/41.1 |
| 2014/0226820 A1* | 8/2014 | Chopra | | H04L 63/061 |
| | | | | 380/277 |
| 2014/0281536 A1* | 9/2014 | Livolsi | | H04L 9/14 |
| | | | | 713/168 |
| 2014/0379882 A1* | 12/2014 | Kim | | H04L 41/0806 |
| | | | | 709/222 |
| 2015/0052348 A1* | 2/2015 | Moskowitz | | H04L 63/168 |
| | | | | 713/151 |
| 2015/0074770 A1* | 3/2015 | McBeath | | G06F 21/44 |
| | | | | 726/4 |
| 2015/0172986 A1* | 6/2015 | Salkintzis | | H04W 36/36 |
| | | | | 455/436 |
| 2015/0326528 A1* | 11/2015 | Murthy | | H04L 63/20 |
| | | | | 726/1 |
| 2016/0080397 A1* | 3/2016 | Bacastow | | H04L 63/10 |
| | | | | 726/1 |
| 2016/0094523 A1* | 3/2016 | Houghton | | H04L 63/0428 |
| | | | | 713/150 |
| 2016/0156462 A1* | 6/2016 | Winslow | | H04L 9/0891 |
| | | | | 380/279 |
| 2016/0182458 A1* | 6/2016 | Shatzkamer | | H04L 63/0428 |
| | | | | 713/168 |
| 2016/0277064 A1* | 9/2016 | Waxman | | H04B 1/713 |
| 2016/0315920 A1* | 10/2016 | Kurmala | | H04L 63/0471 |
| 2016/0378401 A1* | 12/2016 | Savic | | G06F 3/0608 |
| | | | | 710/74 |
| 2017/0126647 A1* | 5/2017 | Zhang | | H04L 63/08 |
| 2017/0364794 A1* | 12/2017 | Mahkonen | | H04L 63/1425 |
| 2018/0013760 A1* | 1/2018 | Usie | | H04N 7/18 |
| 2018/0102051 A1* | 4/2018 | Suthar | | G08G 1/04 |
| 2018/0124085 A1* | 5/2018 | Frayman | | H04L 63/20 |
| 2018/0131593 A1* | 5/2018 | Jain | | H04L 43/18 |
| 2018/0139214 A1* | 5/2018 | Anderson | | H04L 63/0428 |
| 2018/0146030 A1* | 5/2018 | Weng | | H04L 43/20 |
| 2018/0191668 A1* | 7/2018 | Yu | | H04L 65/1073 |
| 2018/0205907 A1* | 7/2018 | Terajima | | H04N 21/4334 |
| 2018/0367321 A1* | 12/2018 | Stammers | | H04W 4/24 |
| 2019/0007429 A1* | 1/2019 | Erinle | | H04L 63/1416 |
| 2019/0109714 A1* | 4/2019 | Clark | | H04L 67/565 |
| 2019/0109821 A1* | 4/2019 | Clark | | H04L 63/0414 |

(56) References Cited

U.S. PATENT DOCUMENTS

| | | | |
|---|---|---|---|
| 2019/0149552 A1* | 5/2019 | Ellingson | H04W 12/02 726/7 |
| 2019/0166052 A1* | 5/2019 | Hadorn | H04L 47/629 |
| 2019/0190961 A1* | 6/2019 | McGrew | H04L 63/1408 |
| 2019/0199886 A1* | 6/2019 | Iwai | G06F 21/608 |
| 2019/0230125 A1* | 7/2019 | Lee | H04L 63/18 |
| 2019/0297161 A1* | 9/2019 | Ayyadevara | H04L 67/56 |
| 2019/0311087 A1* | 10/2019 | Jackson | G06F 30/15 |
| 2019/0335551 A1* | 10/2019 | Williams | H05B 45/24 |
| 2020/0036610 A1* | 1/2020 | Indiresan | H04L 69/22 |
| 2020/0053103 A1* | 2/2020 | Rehak | H04L 63/0428 |
| 2020/0107220 A1* | 4/2020 | Shreevastav | H03M 7/607 |
| 2020/0169509 A1* | 5/2020 | Tigli | H04L 47/2441 |
| 2020/0186358 A1* | 6/2020 | Capola | H04L 9/3228 |
| 2020/0204591 A1* | 6/2020 | Yang | H04L 63/0428 |
| 2020/0236108 A1* | 7/2020 | Mital | G06F 21/606 |
| 2020/0236131 A1* | 7/2020 | Vejman | H04L 63/1416 |
| 2020/0236140 A1* | 7/2020 | Srinivasan | H04L 5/0055 |
| 2020/0344040 A1* | 10/2020 | Abdolee | H04L 9/0668 |
| 2021/0006451 A1* | 1/2021 | Robinson | H04L 27/0008 |
| 2021/0014043 A1* | 1/2021 | Jenkins | H04L 9/006 |
| 2021/0021994 A1* | 1/2021 | Kolekar | H04W 8/24 |
| 2021/0036901 A1* | 2/2021 | Robinson | H04W 12/03 |
| 2021/0144160 A1* | 5/2021 | Rodniansky | H04L 67/01 |
| 2021/0152526 A1* | 5/2021 | Kohout | H04L 41/12 |
| 2021/0194925 A1* | 6/2021 | Xiao | H04L 63/0227 |
| 2021/0226880 A1* | 7/2021 | Ramamoorthy | H04L 41/40 |
| 2021/0266346 A1* | 8/2021 | Gordon | H04L 63/0245 |
| 2021/0303984 A1* | 9/2021 | Lan | G06N 20/20 |
| 2021/0314359 A1* | 10/2021 | Thyagaturu | H04L 63/029 |
| 2021/0329456 A1* | 10/2021 | Preda | H04W 12/009 |
| 2021/0336770 A1* | 10/2021 | Ahmed | H04L 9/008 |
| 2021/0385195 A1* | 12/2021 | Kondapavuluru | H04L 63/0272 |
| 2021/0385648 A1* | 12/2021 | Amend | H04W 12/037 |
| 2021/0400125 A1* | 12/2021 | Melton | H04L 69/22 |
| 2022/0209943 A1* | 6/2022 | Syrivelis | H04L 63/061 |
| 2022/0343241 A1* | 10/2022 | Jha | G08G 1/166 |

* cited by examiner

NON-INTERFERING ACCESS LAYER END-TO-END ENCRYPTION FOR IOT DEVICES OVER A DATA COMMUNICATION NETWORK

FIELD OF THE INVENTION

The invention relates generally to computer networking, and more specifically, to providing proxy encryption services for non-interfering end-to-end encrypted communications for the plurality of headless endpoint devices (e.g., legacy devices) with destinations over a data communication network.

BACKGROUND

The OT (Operational Technology) and IOT (Internet of Things) environments often include legacy devices that were not intended for network environments. These headless devices are not able to update software and may not have native networking capabilities. The data path extends from a first switch port to a second switch port, both part of the same enterprise network, or whether the data path extends across the Internet to remote networks. Unfortunately, the data generated by these devices is particularly vulnerable because it is unencrypted.

Traditionally, OT cyber security was not necessary because OT systems were not connected to the IP networks. As such, they were not exposed to network-based threats. As digital innovation initiatives expanded and IT and OT networks converged, organizations tended to bolt-on specific point solutions to address specific issues. These approaches to OT security resulted in a complex network where solutions could not share information and provide full visibility.

Often, IT and OT networks are kept separate, duplicating security efforts and eschewing transparency. These IT OT networks cannot track what is happening throughout the attack surface. Typically, OT networks report to the COO and IT networks report to the CIO, resulting in two network security teams each protecting half of the total network. This can make it difficult to identify the boundaries of the attack surface because these disparate teams do not know what is attached to their own network. In addition to being difficult to efficiently manage, OT IT networks contain huge gaps in security.

One network switch encryption scheme requires significant configuration overhead on both sides. MACSec (IEEE 802.1AE-2006) operates at OSI (Open Systems Interconnection) layer 2 on the ethernet frame, and is designed for inter-switch traffic (e.g., for VLAN trunks) exchange of data between switches and requires every networking device exchanging information to be MACSec enabled too. All of layers 2, 3 and 4 are encrypted, including network information too, so MACsec only works in LANs not through routers. In OT and IOT environments this is difficult if not impossible for many clients. For example, Spanning Tree Protocol frames cannot currently be encrypted using MACsec, and as these environments are usually legacy or limited in terms of networking equipment, it's not an option that has been adopted. Similarly, IPSec operates at OSI layer 3 and SSL operates at OSI layer 4. Interference with lower OSI layers can affect transit of the frame, packet or segment information.

Therefore, what is needed is a robust technique for network switches and other network devices providing proxy encryption services for end-to-end encrypted communications of upper layers, without encrypting lower layers, for the plurality of headless endpoint devices with communicating over a data communication network.

SUMMARY

These shortcomings are addressed by the present disclosure of methods, computer program products, and systems for providing proxy encryption services for end-to-end encrypted communications for the plurality of headless endpoint devices with destinations over a data communication network.

In one embodiment, MAC addresses for the plurality of headless endpoint devices are registered with a network switch device or other network device (e.g., an access point or gateway device). Once a new session of data packets is detected, whether to proxy encrypt the data packets, on behalf of a specific headless endpoint device from the plurality of headless endpoint devices for a session, is determined based on analysis of payload data of a data packet from a session. Responsive to a determination to proxy encrypt data packets, encryption attributes are set up between a local data port on the network device and a remote data port on a remote network device as parsed from a header of the data packet.

In another embodiment, outbound data packets of the session are parsed and OSI layers 4 to 7 of the outbound data packets of the session are encrypted, according to the encryption attributes, and generate encrypted outbound data packets. Inbound data packets of the session are parsed and layers 4 to 7 of the inbound data packets are decrypted, according to the encryption attributes. Decrypted inbound data packets are generated and transmitted across the secured data channel (e.g., to another OT device).

Advantageously, secured data communications allow OTs can be used in sensitive operations, without slowing down network traffic.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for providing proxy encryption services for end-to-end encrypted communications for the plurality of headless endpoint devices with destinations over a data communication network.

One of ordinary skill in the art will recognize many additional variations made possible by the succinct description of techniques below.

I. Systems for Proxy End-to-End Encryption Services (FIGS. 1-2)

Figure 1:
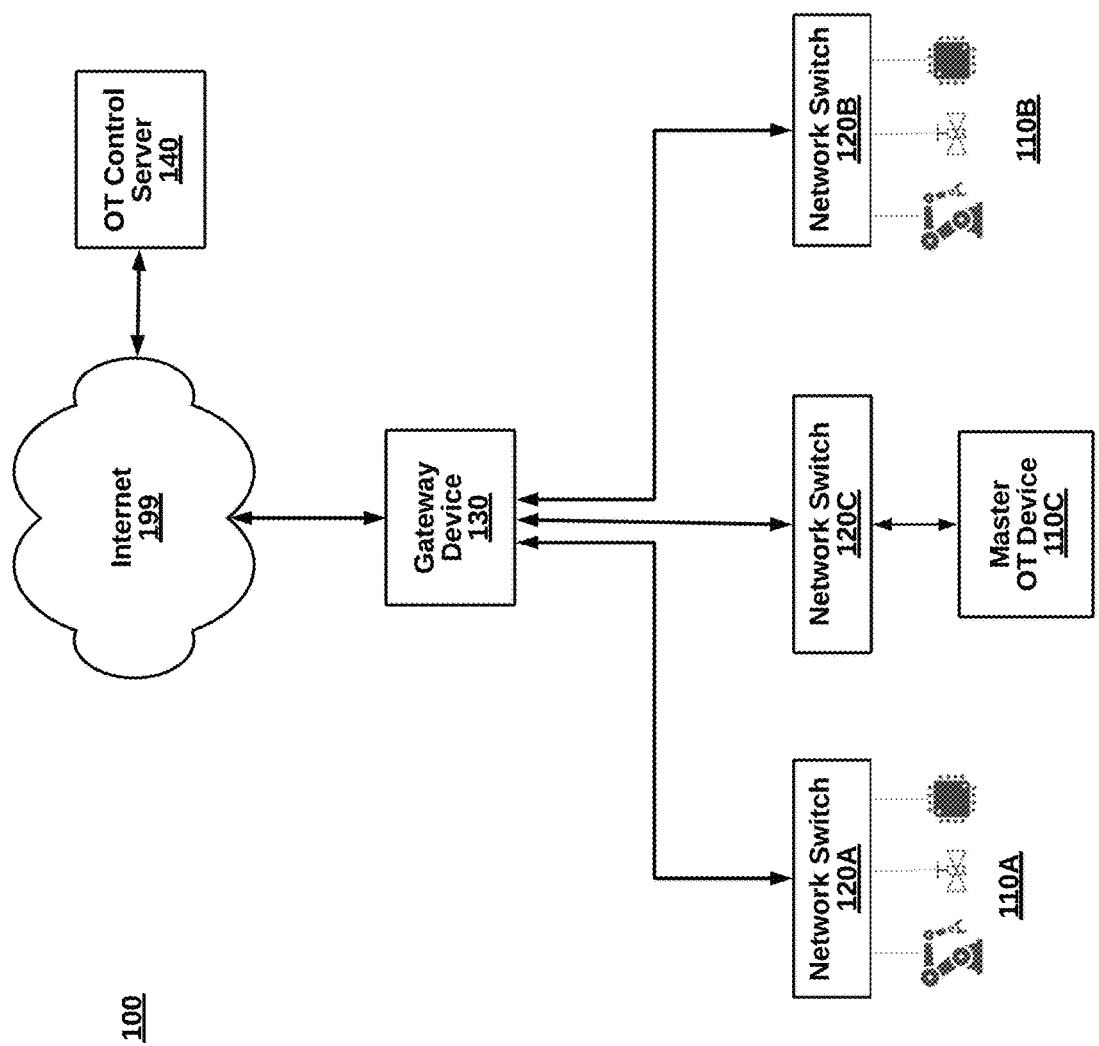
FIG. 1 is a high-level illustration of a system for providing proxy encryption services for end-to=end encrypted communications for the plurality of headless endpoint devices with destinations over a data communication network, according to an embodiment.
Figure 2:
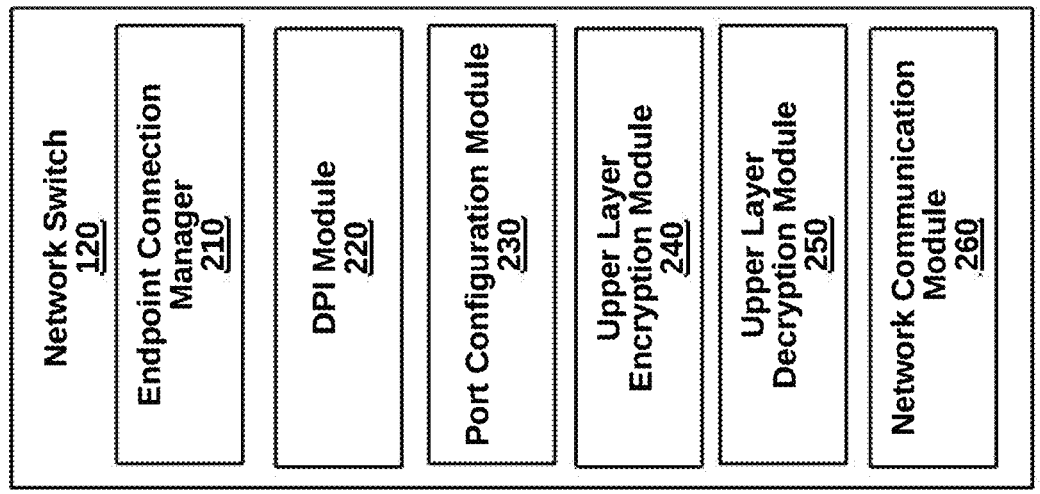
FIG. 2 is a more detailed illustration of a network switch device of the system of FIG. 1, according to an embodiment.
Figure 3:
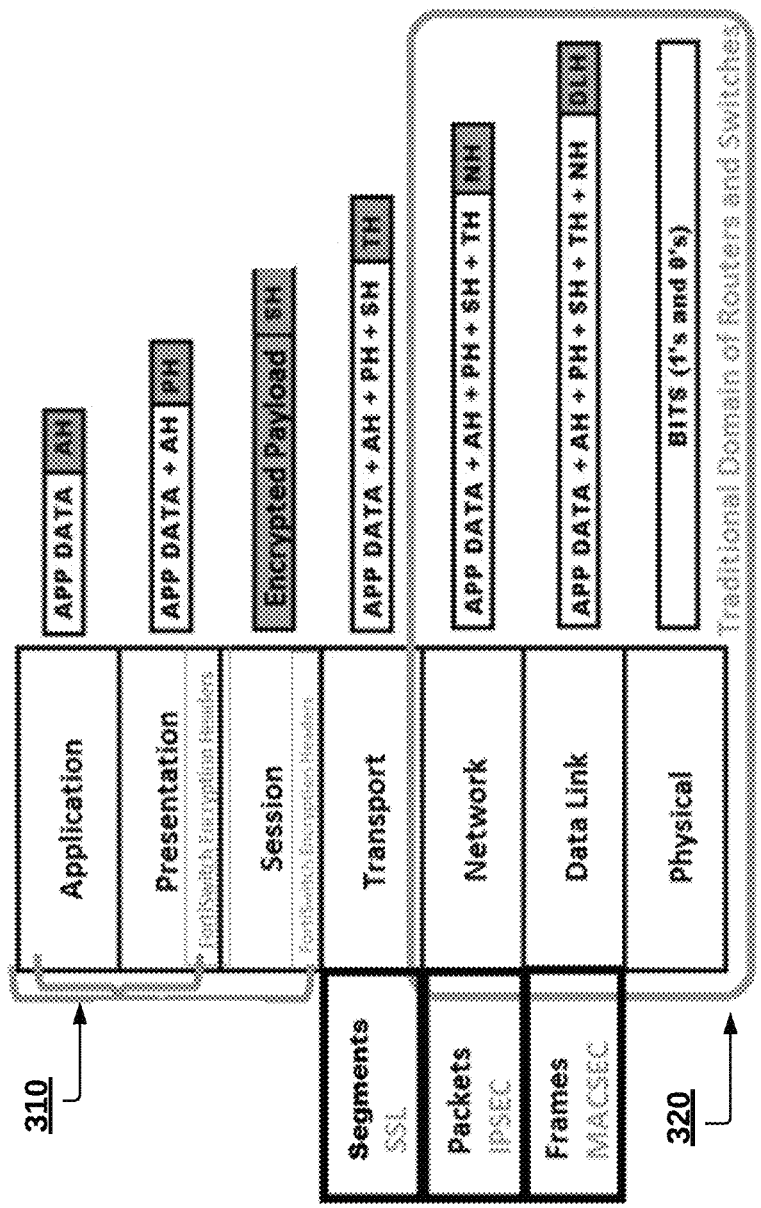
FIG. 3 is an interaction diagram illustrating OSI layers relative to encryption, for the components of FIG. 1, according to some embodiments.

FIG. 1 is a high-level illustration of a system 100 for providing proxy encryption services for end-to-end encrypted communications for the plurality of headless endpoint devices with destinations over a data communication network, according to an embodiment. The system 100 includes, in part, OT devices 110A, 110B, and master OT device 110C, network switches 120A, 120B, 120C, gateway device 130, OT control server 140. Many other embodiments are possible, for example, more or fewer access points, more or fewer stations, and additional components, such as firewalls, routers and switches. In another embodiment, IoT devices are connected to one or more access points. The system 100 components can be located locally on a LAN or include remote cloud-based devices, and can be implemented in hardware, software, or a combination similar to the example of FIG. 6.

The components of the system 100 are coupled in communication over a Internet 199. Preferably, network switches 120A, 120B 130 are connected to the data communication system via hard wire. Other components, such as the headless IoT devices can be connected indirectly via wireless connection. The Internet 199 can be any data communication network such as a WAN, a LAN, WLAN, a cellular network (e.g., 3G, 4G, 5G or 6G), or a hybrid of different types of networks. Various data protocols can dictate format for the data packets.

In one embodiment, OT devices 110A, 110B, 110C are coupled in communication over an enterprise network. Additionally, the master OT device 110C is a local control of OT devices while the OT control server 140 can be remotely located over the Internet for control by apps, and other means. OT, generally, is the use of hardware and software to monitor and control physical processes, devices, and infrastructure. OT systems are found across a large range of asset-intensive sectors, performing a wide variety of tasks ranging from monitoring critical infrastructure to controlling robots on a manufacturing floor. OT is used in a variety of industries including manufacturing, oil and gas, electrical generation and distribution, aviation, maritime, rail, and utilities. In some embodiments, the OT devices 110A, 110B are headless, meaning that network communications are not native to the device. The first portion of network communication would be unprotected without the proxy encryption services described herein. In alternative embodiments, IoT devices are headless (e.g., legacy devices) and need proxy encryption. To this end, a wireless communication channel is accessed for connection with an access point that provides proxy encryption.

The network switches 120A, 120B, 120C, in an embodiment, provides proxy encryption on the upper layers while excluding the lower layers. OT device 110A may transmit data to OT device 110B. Similarly, OT device 110A may transmit results data in response to a control signal sent from the master OT device 110C. Data packets from the OT device, headed to another OT device or a server. In one implementation, a need for proxy encryption services is automatically detected using DPI of data packet payloads. An analysis of the data packet payloads can identify a specific app, a specific protocol, sensitive contents that need encryption, or unencrypted data of any type. In one example, the network switch identifies OT data from a specific vendor, and sets up an encrypted channel to a second network switch. The network switch transmits the encrypted data packets to a second network switch. This end-to-end encryption service can be transparent to underlying OT devices. Example encryption schemes for upper layers include, but are not limited to, SSL/TLS, AES, the Signal Protocol, HTTPS and PKI.

One embodiment of an access point provides proxy encryption on the upper layers while excluding encryption on the lower layers. For example, a headless IoT device may have to capability for basic wireless data communications, but not the capability for large software updates and encryption software. These headless IoT devices may be able to handle small software updates (e.g., driver update, or credentials update), in an embodiment. In another embodiment, if an underlying device in the network hierarchy, such as the network switch, has already encrypted the data packet payload, the process can be bypassed. The bypassed process increases efficiency for packet processing within the network while maintaining end-to-end encryption.

The gateway device 130 can be within the encrypted data path. In one case, the gateway device 130 also provides proxy encryption services for unencrypted data packet payloads. The lower layers of data packet can be used by the gateway device 130 for routing, without the need for decryption. Another embodiment of the gateway device 130 manages the multiple network switches 120A, 120B, 120C which can be located across different subnets, in some instances. For example, the gateway device 130 can connect a first site located at the network switch 120A and a second site located at the network switch 120B. Yet another embodiment of the gateway device 130 provides firewall, IPS and other network security services.

FIG. 2 is a more detailed illustration of a network switch 120 (representative of network switches 120A, 120B and 120C) of the system 100 of FIG. 1. One of ordinary skill in the art will recognize that besides a switch, an access point, gateway, or network controller can be similarly modified. The network switch includes an endpoint connection manager 210, a DPI (deep packet inspection) module 220, a port configuration module 230, an upper layer encryption module 240, an upper layer decryption module 250, and a network communication module 260. The modules can be implemented in source code stored in non-transitory memory executed by a processor. Alternatively, the modules can be implemented in hardware with microcode. The modules can be singular or representative of functionality spread over multiple components. Many other variations are possible.

The endpoint connection manager 210 to register MAC (Media Access Channel) addresses for the plurality of headless endpoint devices.

The DPI module 220, in an implementation, determines whether to proxy encrypt the data packets, on behalf of a specific headless endpoint device from the plurality of headless endpoint devices for a session, based on analysis of payload data of a data packet from a session. A deep packet inspection can be performed by hardware and/or software. Different applications and protocols have characteristics that can be used to identify the applications from data in a data packet payload. One aspect of the DPI module 220 determines whether the communications are encrypted, if not, encrypts the upper layers. Another aspect of the DPI module 220 uses prediction technologies based on probabilistic models to identify subject matter of data packet payloads. Once a determination has been made for a session, subsequent data packets can be treated identically without deep packet inspection.

The port configuration module 230, responsive to a determination to proxy encrypt data packets, sets up encryption attributes between a local data port on the network device and a remote data port on a remote network device as parsed from a header of the data packet. The data ports can be Ethernet data ports or Wi-Fi client data ports. The two data ports can be configured for the same encryption/decryption algorithms. Rate of data transfer and other parameters unrelated to security can also be configured between the two ports. In one embodiment, both data ports are directly coupled to headless OT devices 110A, 110B.

The upper layer encryption module 240 parses outbound data packets of the session and encrypt OSI layers 4 to 7 of the outbound data packets of the session according to the encryption attributes. There is no (or negligible) interference with the lower layers during encryption. The upper layer encryption module 240 generates encrypted outbound data packets protected from Internet threats, using the original lower layers.

The upper layer decryption module 250 parses inbound data packets of the session and decrypt layers OSI 4 to 7 of the inbound data packets according to the encryption attributes. The decryption algorithm is typically based on the encryption algorithm. Once decrypted, the upper layer decryption module 250 can generate decrypted inbound data packets for connected OT devices. Encryption and decryption are performed without interference with the lower layers.

The network communication module 260 transmits the encrypted outbound data packets from the specific headless endpoint device. Additionally, the network communication module transmits the decrypted inbound data packets to the specific headless endpoint device. The network communication module 260 can include channel communication peripherals, such as network protocol software, network transceivers, antenna, device input/output ports, and the like.

II. Methods for Proxy End-to-End Encryption Services (FIGS. 4-5)

Figure 4:
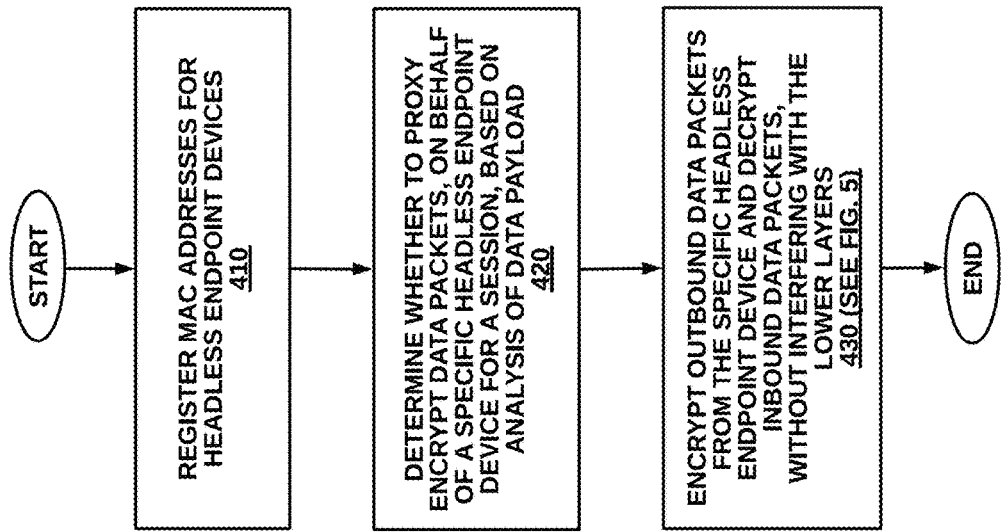
FIG. 4 is a high-level flow diagram illustrating a method for providing proxy encryption services for end-to-end encrypted communications for the plurality of headless endpoint devices with destinations over a data communication network, according to one preferred embodiment.
Figure 5:
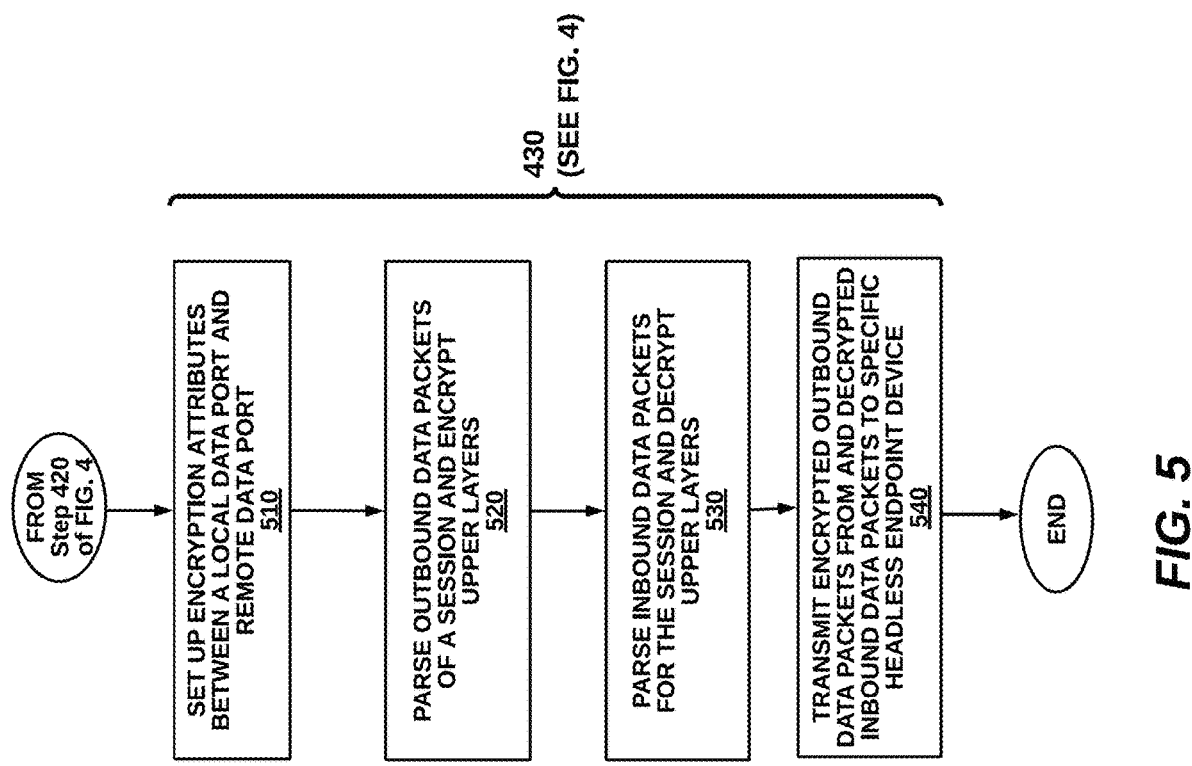
FIG. 5 is a more detailed flow diagram illustrating the step of encrypting and decrypting without interfering with the lower layers, for the method of FIG. 4, according to one embodiment.

FIG. 4 is a high-level flow diagram illustrating a method for providing proxy encryption services for end-to-end encrypted communications for the plurality of headless endpoint devices with destinations over a data communication network, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, MAC addresses are registered for the plurality of headless endpoint devices. A list of MAC addresses can be maintained by adding newly connected devices and delisting disconnected devices.

At step 420, determine whether to proxy encrypt the data packets, on behalf of a specific headless endpoint device from the plurality of headless endpoint devices for a session, based on analysis of payload data of a data packet from a session.

At step 430, responsive to a determination to proxy encrypt data packets, encrypt outbound data packets from the specific headless endpoint device and decrypt inbound data packets. The encryption step 430 is described in more detail in FIG. 5.

More specifically, at step 510, encryption attributes are set up between a local data port on the network device and a remote data port on a remote network device. The source and destination can be parsed from a header of the data packet or identified in data packet payload.

At step 520, parse outbound data packets of the session and encrypt upper layers (e.g., OSI layers 5 to 7, or just one or two layers of 5 to 7) of the outbound data packets of the session according to the encryption attributes. Encrypted outbound data packets are generated. Layers 1 to 4 are not encrypted.

At step 530, parse inbound data packets of the session and decrypt layers upper layers (e.g., 5 to 7) of the inbound data packets according to the encryption attributes.

At step 540, the network interface transmits the encrypted outbound data packets from the specific headless endpoint device. Decrypted inbound data packets are transmitted to the specific headless endpoint device.

III. Generic Computing Device (FIG. 6)

Figure 6:
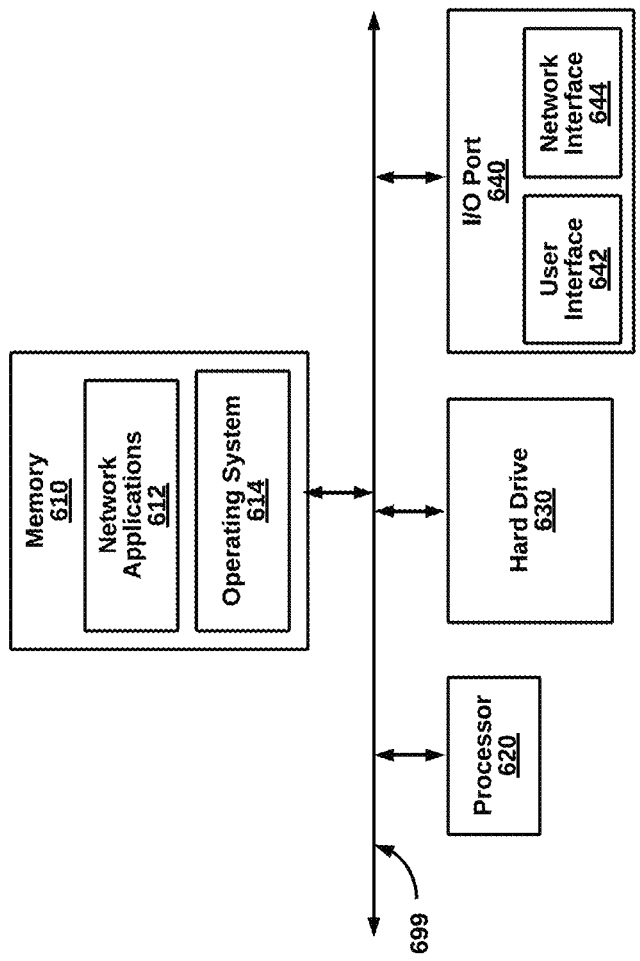
FIG. 6 is an example of a computing environment, according to an embodiment.

FIG. 6 is a block diagram illustrating an example computing device 600 for use in the system 100 of FIG. 1, according to one embodiment. The computing device 600 is implementable for each of the components of the system 100 (e.g., the network switches 120A, 120B, 120C, the gateway device 130, and the OT Control Server 140). The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A network switch device communicatively coupled to a plurality of headless endpoint devices for providing proxy encryption services for end-to-end encrypted communications for the plurality of headless endpoint devices with destinations over a data communication network, the network switch device comprising:
   a processor;
   a network interface communicatively coupled to the processor and to the data communication network to receive inbound data packets for a plurality of headless endpoint devices and to receive outbound data packets from a plurality of headless endpoint devices; and
   a memory, communicatively coupled to the processor and storing:
      an endpoint connection manager to register MAC addresses for the plurality of headless endpoint devices;
      a DPI module to determine whether to proxy encrypt the data packets, on behalf of a specific headless endpoint device from the plurality of headless endpoint devices for a session, based on analysis of payload data of a data packet from a session;

a port configuration module to, responsive to a determination to proxy encrypt data packets, set up encryption attributes between a local data port on the network switch device and a remote data port on a remote network device as parsed from a header of the data packet;

an encryption module to parse outbound data packets of the session and encrypt OSI layers 5 to 7 of the outbound data packets of the session according to the encryption attributes, and generate encrypted outbound data packets; and a decryption module to parse inbound data packets of the session and decrypt layers 5 to 7 of the inbound data packets according to the encryption attributes, and generate decrypted inbound data packets, wherein the network interface transmits the encrypted outbound data packets from the specific headless endpoint device, and transmits the decrypted inbound data packets to the specific headless endpoint device.

2. The network switch device of claim 1, wherein the DPI module determines to proxy encrypt the data packets responsive to the analysis of the data packet payload detecting HTTP only mod bus only, or bacnet.

3. The network switch device of claim 1, wherein the DPI module determines not to proxy encrypt the data packets responsive to the analysis of the data packet payload.

4. The network switch device of claim 1, wherein a first OT device is authenticated with the access point and a second OT device is authenticated with a second access point, wherein a Wi-Fi controller manages both the access point and the second access point.

5. The network switch device of claim 1, wherein the endpoint device sending the data packets of the session is incapable of encryption.

6. The network switch device of claim 1, wherein the encryption module encrypts HTTP data packets with HTTPS.

7. The network switch device of claim 1, wherein the endpoint device sending the data packets of the session is a headless device.

8. The network switch device of claim 1, wherein the encryption module does not interfere with OSI layers 1 to 3 of the data packet.

9. The network switch device of claim 1, wherein the specific headless endpoint device connects wirelessly to the network interface of the network device.

10. The network switch device of claim 1, wherein the network device is also communicatively coupled to the Internet.

11. A method in a network switch device, implemented at least partially in hardware and communicatively coupled to a plurality of headless endpoint devices, for providing proxy encryption services for end-to-end encrypted communications for the plurality of headless endpoint devices with destinations over a data communication network, the method comprising the steps of:

registering MAC addresses for the plurality of headless endpoint devices;

determining whether to proxy encrypt the data packets, on behalf of a specific headless endpoint device from the plurality of headless endpoint devices for a session, based on analysis of payload data of a data packet from a session;

responsive to a determination to proxy encrypt data packets, setting-up encryption attributes between a local data port on the network switch device and a remote data port on a remote network device as parsed from a header of the data packet;

parsing outbound data packets of the session and encrypt OSI layers 5 to 7 of the outbound data packets of the session according to the encryption attributes, and generate encrypted outbound data packets; and parsing inbound data packets of the session and decrypt layers 5 to 7 of the inbound data packets according to the encryption attributes, and generate decrypted inbound data packets, wherein the network interface transmits the encrypted outbound data packets from the specific headless endpoint device, and transmits the decrypted inbound data packets to the specific headless endpoint device.

12. A non-transitory computer-readable media in a network switch device, implemented at least partially in hardware and communicatively coupled to a plurality of headless endpoint devices for, when executed by a processor, for providing proxy encryption services for end-to-end encrypted communications for the plurality of headless endpoint devices with destinations over a data communication network, the method comprising the steps of:

registering MAC addresses for the plurality of headless endpoint devices;

determining whether to proxy encrypt the data packets, on behalf of a specific headless endpoint device from the plurality of headless endpoint devices for a session, based on analysis of payload data of a data packet from a session;

responsive to a determination to proxy encrypt data packets, setting-up encryption attributes between a local data port on the network switch device and a remote data port on a remote network device as parsed from a header of the data packet;

parsing outbound data packets of the session and encrypt OSI layers 5 to 7 of the outbound data packets of the session according to the encryption attributes, and generate encrypted outbound data packets; and parsing inbound data packets of the session and decrypt layers 5 to 7 of the inbound data packets according to the encryption attributes, and generate decrypted inbound data packets, wherein the network interface transmits the encrypted outbound data packets from the specific headless endpoint device, and transmits the decrypted inbound data packets to the specific headless endpoint device.

* * * * *